United States Patent [19]

Ichikawa et al.

[11] Patent Number: 4,834,636

[45] Date of Patent: May 30, 1989

[54] TIRE CENTERING AND REMOVAL DEVICE FOR A TIRE VULCANIZING PRESS

[75] Inventors: Katsumi Ichikawa; Touhachiro Sakon, both of Kyogo, Japan

[73] Assignees: Kabushiki Kaisha Kobe Seiko Sho; Sumitomogomu Kougyo Kabushiki Kaisha, both of Kobe, Japan

[21] Appl. No.: 147,562

[22] Filed: Jan. 19, 1988

Related U.S. Application Data

[63] Continuation of Ser. No. 18,830, Feb. 24, 1987, abandoned, which is a continuation of Ser. No. 812,296, Dec. 23, 1985, abandoned.

[51] Int. Cl.$^4$ .............................. B29C 33/44
[52] U.S. Cl. .................................. 425/38; 414/749; 425/52
[58] Field of Search .................. 425/38, 52; 414/749, 414/750

[56] References Cited

U.S. PATENT DOCUMENTS

| | | | |
|---|---|---|---|
| 3,380,115 | 4/1968 | Soderquist | 425/38 |
| 4,025,251 | 5/1977 | Cantarutti | 425/38 |
| 4,131,402 | 12/1978 | Pirovano | 425/38 |
| 4,170,442 | 10/1979 | Singh | 425/38 |
| 4,279,438 | 7/1981 | Singh | 425/38 |
| 4,338,069 | 7/1982 | Singh et al. | 425/38 |
| 4,385,027 | 5/1983 | Nakawa et al. | 425/38 |
| 4,462,776 | 7/1984 | Fujimoto et al. | 425/38 |
| 4,573,859 | 3/1986 | Amano et al. | 425/38 |
| 4,578,023 | 3/1986 | Irie | 425/38 |
| 4,580,958 | 4/1986 | Crumbacher | 425/34.1 |
| 4,606,714 | 8/1986 | Nixon et al. | 425/38 |
| 4,702,669 | 10/1987 | Ichikawa et al. | 425/38 |

FOREIGN PATENT DOCUMENTS

| | | |
|---|---|---|
| 45-24018 | 8/1970 | Japan . |
| 55-111243 | 8/1980 | Japan . |
| 57-140144 | 8/1982 | Japan . |

*Primary Examiner*—Willard Hoag
*Attorney, Agent, or Firm*—Oblon, Fisher, Spivak, McClelland & Maier

[57] ABSTRACT

A tire vulcanizing press, including a vertical metal mold capable of being opened and closed; a central mechanism arranged on a center portion of a lower portion of the metal mold; a bladder held in the central mechanism in a liftable, extendable, and contractible manner; a centering device for a tire to be removed from the mold; and a tire removal arm provided on a first side of the vulcanizing press so as to be horizontally movable back and forward with respect to the vulcanizing press movable perpendicularly up and down at a center portion of the metal mold; the centering device including a centering arm which includes a plurality of centering bars and which is movable back and forward with the removal arm, is separately movable up and down perpendicularly at the center of the metal mold, and is movable back and forward in a radial direction of the tire within a tire opening edge.

5 Claims, 8 Drawing Sheets

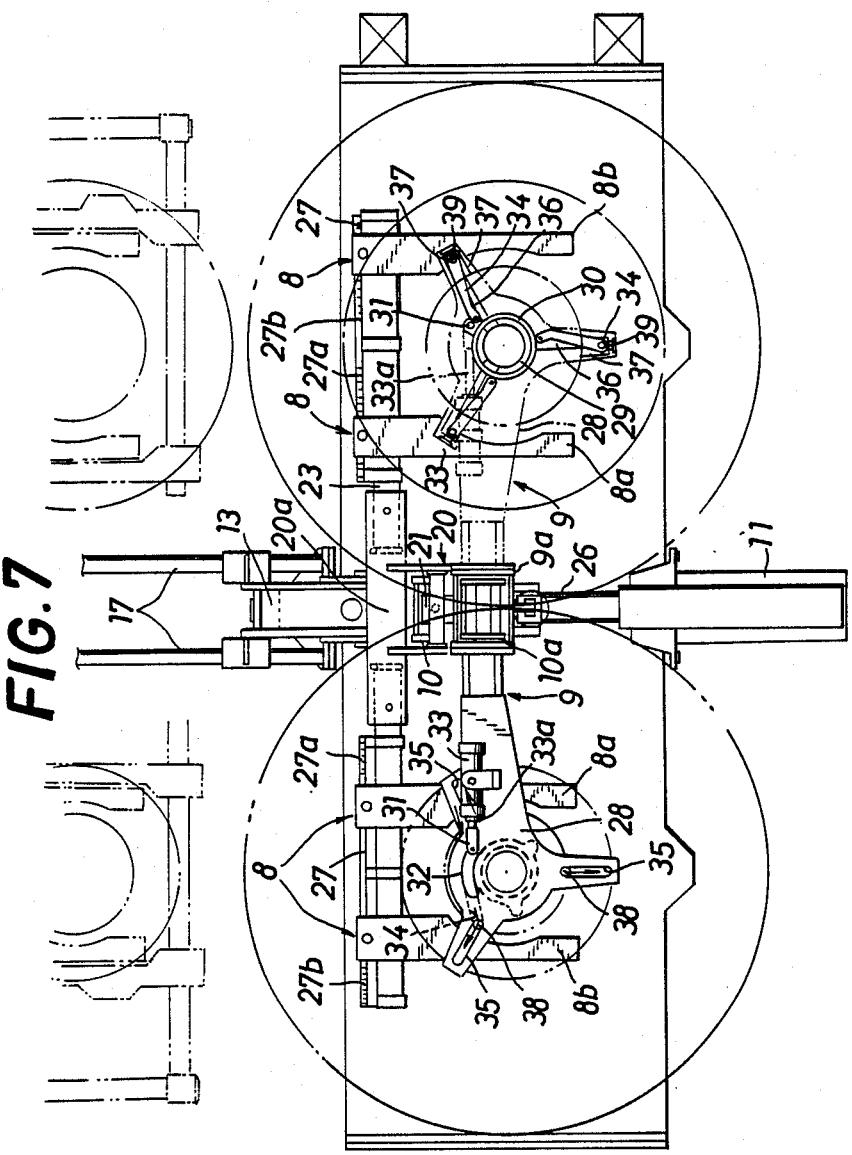

TIRE CENTERING AND REMOVAL DEVICE FOR A TIRE VULCANIZING PRESS

This application is a continuation of application Ser. No. 018,830, filed on Feb. 24, 1987, now abandoned, which was a continuation of application No. 812,296, filed Dec. 23, 1985, now abandoned.

BACKGROUND OF THE INVENTION

1. Field of the Invention

The present invention relates to the arrangement of ensuring safe removal of a vulcanized tire to be attained without a shift of the tire center, when removing the tire from the tire vulcanizing press to feed it to a post inflator.

2. Description of the Prior Art

As is commonly known, the tire vulcanizing press, the main constituent members of which comprise a vertical metal mold and a bladder, expansible and contractible, which is held by a central mechanism arranged on the center of the lower metal mold, performs pressurizing and vulcanizing the tire by way of loading a green tire on the lower metal mold with a tire loader, a closure mold clamping of the upper metal mold with the lower metal mold, a linear contact of the bladder with the internal surface of the tire, a supply of pressurized heat medium such as steam and the like into the bladder, and heating of the vertical metal mold, and, at that time, the vulcanized tire is removed from the metal mold, breaks away from the bladder, and is transferred to the post inflator to undergo the necessary after-treatment.

When taking off the tire, conventionally, as referred to in the official gazette of Japanese Patent Publication No. SHO (55)-111243, using a tire unloader, the tire is taken up, released backward, and the deadweight of the tire is usually utilized to transfer the tire to the post inflator via an inclined roller conveyor. According to such a traditional art, since the tire is removed from the center of the vulcanizing press (the center of the metal mold), being removed to the side of the post inflator in its free condition, in order to precisely remove the same, various kinds of guides and other attitude controlling means are needed on the aforementioned conveyor and there is a difficulty in preventing shifting of the tire center, which is given first priority. The same is true with respect to the type of transfer of the tire, while driving rotationally the roller conveyor.

In place of the aforementioned method, as referred to in the official gazette of Japanese Patent Provisional Publication No. SHO (55)-1112, another removal means is utilized wherein a support arm which movably supports the upper surface of the tire, when the tire unloader is introduced on the lower surface of the tire, is separately provided so that the tire is held sandwiched between the unloader and the support arm, is proposed, but since there is much apprehension regarding deformation and damage to the tire which has been vulcanized, not only difficulty in supporting the tire but also impossibility in correcting the shift of the tire center even by the above-mentioned means occurs.

SUMMARY OF THE INVENTION

The first object of the present invention is to perform correlation of the shift of the tire center simultaneously with exact and stable removal of the tire, vulcanized and fabricated with the tire vulcanizing press, therefrom.

A further object of the present invention is to provide a method whereby, by means of rendering a motion of the tire removal member and the centering member to such a simple movement as a horizontal direct advance and a perpendicular elevating movement, apprehension of incurring an irregularity of the tire, caused by its positional distortion, is avoided, and centering of the tire which has just been released from the metal mold is performed on the center of the vulcanizing press, thereby enabling the tire to be stably and exactly fed to the side of the post inflator.

An additional object of the present invention is that, when removing the tire from the metal mold with the tire takeoff member, the tire is received by the tire removal member, while it is taking a horizontal attitude, is adapted to move up perpendicularly, corrects the shift of its center at a position concentric to that of the center of the metal mold by means of the tire centering member accompanying the tire removal member, upon the completion of its upward motion, and, subsequently, by means of permitting it to retreat from the vulcanizing press, accompanying both the members, an exact and safe transferrance of the vulcanized tire can be easily attained.

A further object of the present invention is that the tire, the shift of the center of which is corrected, is drawn out from the vulcanizing press by way of retreating of a bracket, while the takeoff member and the centering member ensure that the tire is vertically held therebetween, and the tire is fed exactly to the side of the post inflator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a plan view of the entirety of the embodiment of the device;

DESCRIPTION OF THE PREFERRED EMBODIMENTS

Figure 1:
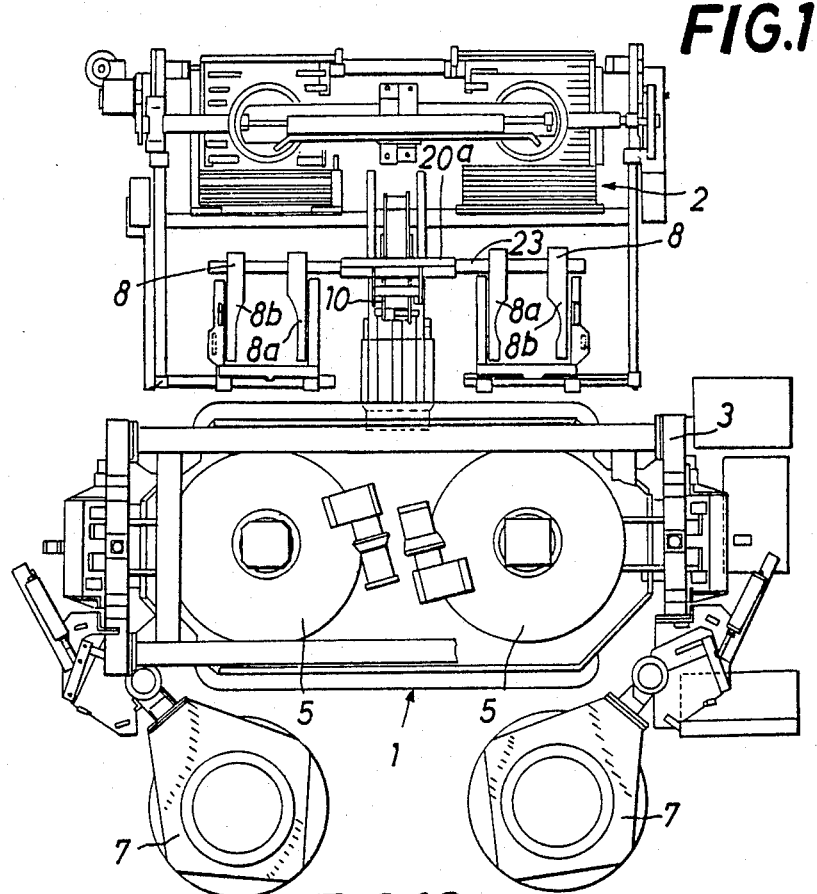
FIG. 1 is a plan view of the entirety of the tire vulcanizing press adopting the device of the present invention.
Figure 2:
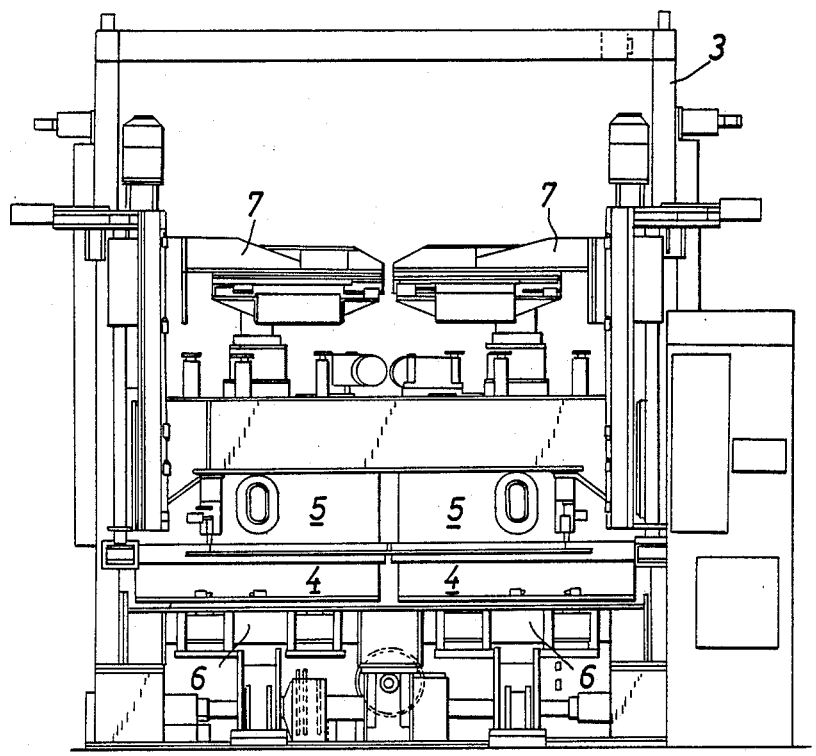
FIG. 2 is a front view of the same.
Figure 3:
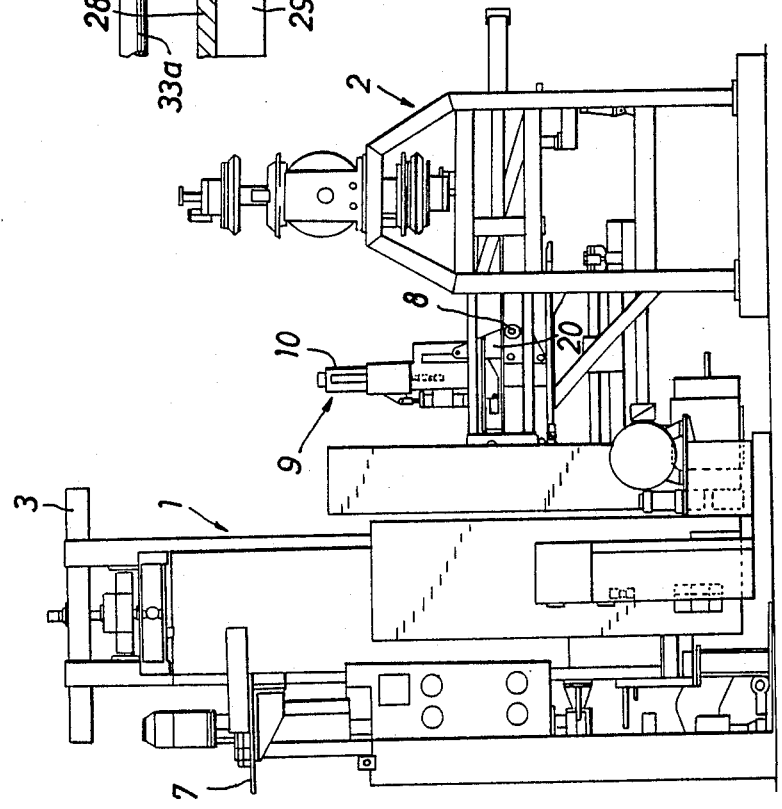
FIG. 3 is a side view of the same.

A description of the embodiment according to the present invention is now made in conjunction with the accompanying drawings as follows:

Referring first to FIGS. 1, 2, & 3, which illustrate the entire arrangement of one example of practically applying the centering device of the present invention of a twin type tire vulcanizing press, the rear part of the tire vulcanizing press 1 is provided with the post inflator 2 in parallel with each other, and the tire being vulcanized and fabricated by the vulcanizing press 1 is taken off from the vulcanizing press 1 to be carried to the side of the post inflator 2. Since the tire vulcanizing press 1 and the post inflator 2 are publicly known, a detailed description of them is omitted. As already known, the vulcanizing press 1 (the main constituent members of which comprise the lower metal mold 4 fixed on a base in a press frame 3, the upper metal mold 5 being illustrated to be provided on the frame 3 in a perpendicularly liftable manner, and a central mechanism 6 equipped with the bladder which is fabricated by elastic material such as a rubber and the like being provided on the side of the base at the central position of the metal mold (the center of the press) in the lower metal mold 4 in a liftable manner as well as linearly contacting the internal surface of the green tire in an expansile and contractible manner) is, for example, illustrated to adopt the twin type wherein two sets of metal molds 4 and 5 are provided on the frame 3 in parallel with each other. Of course, in addition to such a twin type, the present invention may be applicable to a single type of vulcanizing press comprising only one set of metal mold or a multi-type thereof comprising more than two sets of metal molds. Under the vulcanizing machine employing the foregoing construction, as already known, when the tire loader 7 which is illustrated to be rotatable permits the green tire to be loaded on the lower metal mold 4 which is under the open state where the upper metal mold 5 is upward retracted, the bladder in the central bag-well mechanism 6 is maintained to assume cylindrically and upright a stretched attitude. Subsequently, at the same time when the upper metal mold 5 is retracted upward is lowered to close with the lower metal mold 4, during the intermediate course of the foregoing descent, the bladder is deformed and curved to linearly contact the internal surface of the green tire and the upper metal mold 5 accompanies an upper clamp ring holding the upper end of the bladder in an engaged manner, a shaping process of the internal surface of the tire is commenced such that the pressurized heat medium such as the steam and the like is supplied by way of the central mechanism 6 also at the same time, and the pressurizing and the vulcanizing forming of the green tire are performed by way of the closure of the upper metal mold 5 to the lower metal mold 4, mold clamping, heating of the metal molds made through the metal molds 4 and 5 built-in heating plate, and the supply of the pressurized heat medium to the inside of a dome enclosing both the metal molds 4 and 5 and the like. Upon completion of the vulcanizing process, the vulcanized tire breaks away by way of the bladder from the side of the lower metal mold 4 and moves up with the assistance of upward movement of the central mechanism 6 after releasing the mold clamping and retracting up the upper metal mold 5, at the position of moving up the tire unloader which is introduced from outside of the vulcanizing press receives the lower surface of the tire, under the circumstances of which a separate upward motion of the upper clamp ring supporting the upper end of the bladder in the central mechanism 6 causes the bladder to be drawn out in an expansile manner, released from the internal surface of the tire, and deformed to be upright of the cylinder, and, for this reason, an upward motion of the unloader permits the tire to turn aside from the bladder and to move up. As referred to previously, the tire is released or transferred on the inclined roller conveyor or the rotationally driven roller conveyor so that it is directed to the post inflator 2, where it undergoes inflation treatment.

When removing the vulcanized tire from the foregoing vulcanizing press, as illustrated in FIGS. 1 and 3, the present invention utilizes the tire removal arm 8 which is arranged at the central position between the tire vuncalizing press 1 and the post inflator 2, and, at the same time when it is movable back and forward horizontally with respect to the center of the metal mold in the vulcanizing press, is perpendicularly liftable at the central position of the metal mold, and the centering arm 9 which, being also movable back and forward with the aforementioned removal arm 8, corrects the shift of the tire center separately from the removal arm 8 at the central position of the metal mold, performs the tire takeoff and the correction of the shift of the tire center at the same time, and removes the tire from the vulcanizing press by means of both arms 8 and 9, directing the same toward the post inflator 2. The following detailed description covers the structure of the embodiment of both the arms 8 and 9.

Figure 6:
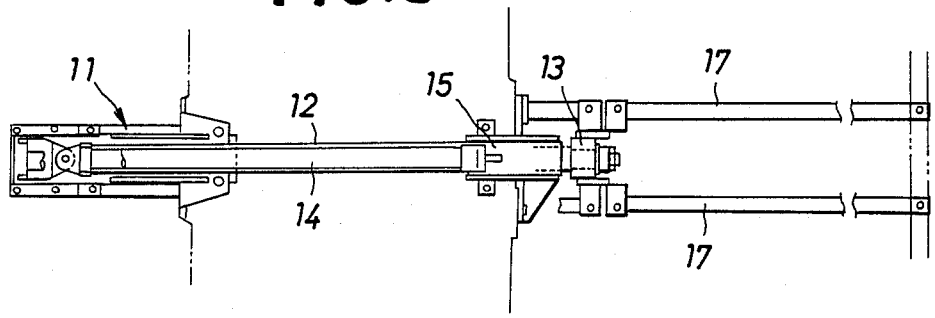
FIG. 6 is a sectional view taken on the line A—A of FIG. 4.
Figure 4:
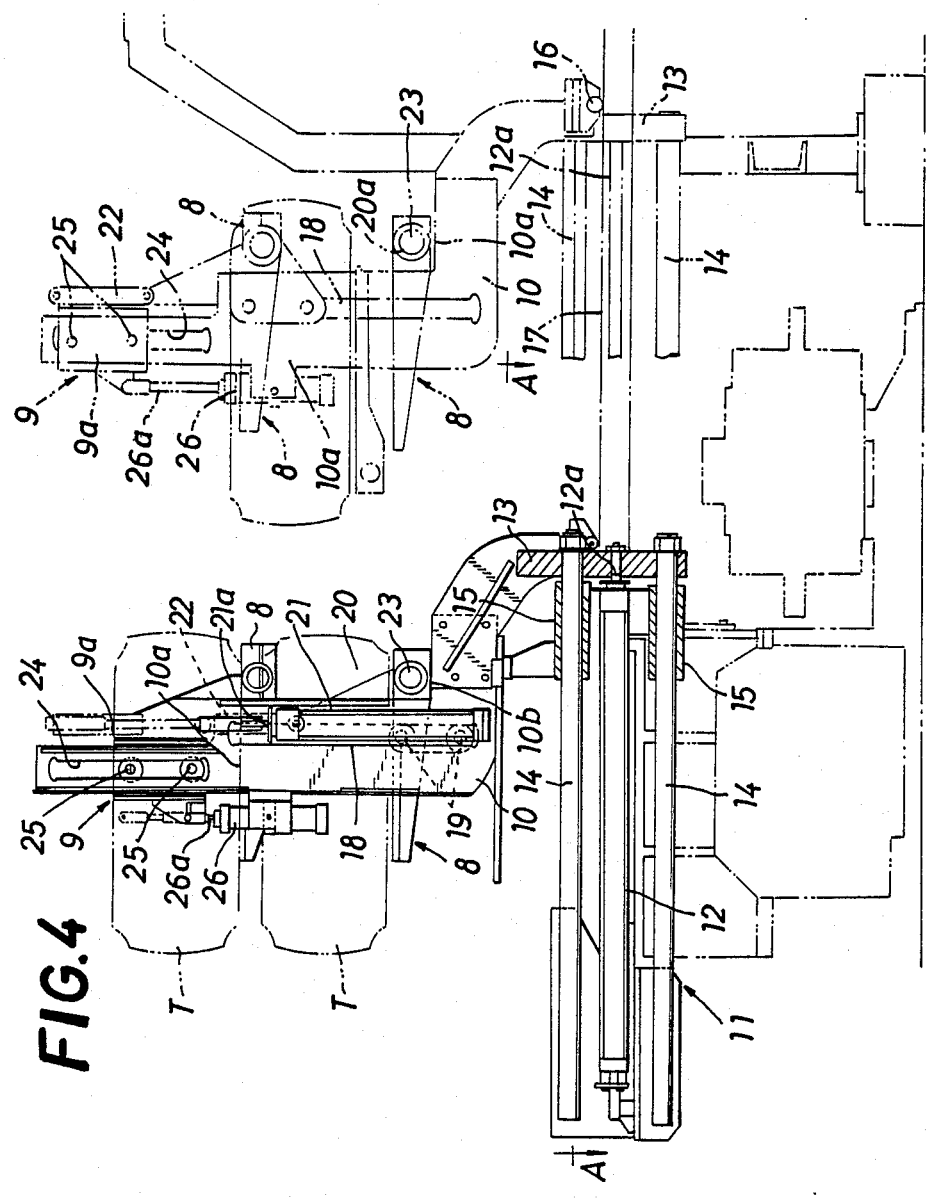
FIG. 4 is a side view of the principle part of the embodiment of the device of the present invention.
Figure 5:
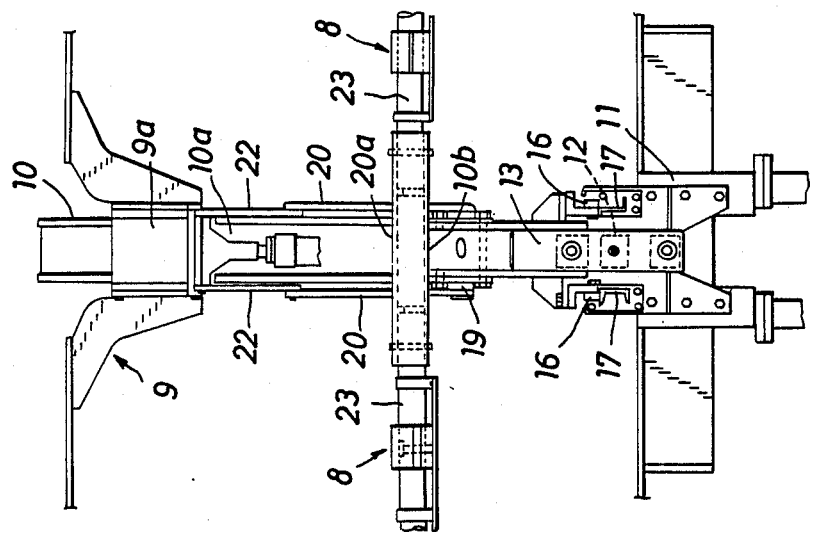
FIG. 5 is a front view of the same.

Referring now to FIGS. 4, 5, and 6, the bracket 10, as the device itself, which supports commonly both of the removal arm 8 and the centering arm 9, is provided such that it, being movable forward and backward with respect to the vulcanizing press 1, is connected by way of a connection part 13 to a piston rod 12a of a drive cylinder 12 (operated by fluid pressure such as hydraulic pressure and others) installed on a fixed engine frame 11. At that time, a plurality of, e.g., two upper and lower pieces of guide shafts 14 which are provided on the connection part 13 are slidably supported within a guide sleeve 15 provided on the side of the fixed engine frame 11 in an insertional manner and guide rollers 16 which are provided on both the left and right sides respectively of the connection part 13 are supported on a guide rail 17 similarly installed on the fixed engine frame 11 in a rotatably movable manner, both of them being auxiliary means for allowing the bracket 10 to be exactly horizontally moved in a straight direction without being swung around. A shaft support 20, equipped with a guide roller 19 is slidably held in a slot 18 being perpendicularly positioned on the lower side of perpendicularly erecting takeoff part 10a of the aforementioned bracket 10, is mounted in a perpendicularly liftable manner by connecting it by way of the ring 22 to the piston rod 21a of the drive cylinder 21 (operated by the fluid pressure such as hydraulic pressure and others) provided on the takeoff part 10a. A holding shaft 23 is nonrotatably fixed to a horizontal sleeve 20a, forming a right angle to the takeoff part 10a, which is provided on some part of the shaft support 20, in an insertional manner. A pair of arms 8a and 8b constituting the removal arm 8, are parallelly mounted to the holding shaft 23 in a rotatable and fixable manner such that a distance between these arms 8a and 8b is adjustable, subject to the tire size. At that time, as shown in FIGS. 4 and 5, upon being located on the shaft support 20 at the lowest position, the aforementioned sleeve 20a is supported so as to be in contact with a horizontal supporting part 10b in the bracket 10. Also in the same views, the removal arm 8 shown by full line in the left side of the view stands for its advancing position, whereas the removal arm 8 shown by chain line in the right side of the FIG. 4 illustrates its retracted position and an intended aim of showing all of the removal arms 8 at both the position in a vertical manner is that the arms being located at the advancing and retracted positions respectively can be prependicularly moved upward and downward.

In contrast with the aforementioned removal arm 8, as shown in FIGS. 4 and 5 illustrating the elevating structure of the centering arm 9, it has a guide roller 25 being provided on the main body 9a of the centering arm 9 held slidably in the slot 24 which is perpendicularly positioned on the upper side of the mounting part 10a of the bracket 10, the main body 9a fitted externally around the mounting part 10a, and the piston rod 26a of the drive cylinder 26 (operated by the fluid pressure such as air pressure and others) being provided on the mounting part 10a connected to the main body 9a, whereby the centering arm 9 is provided such that it can be moved up and down separately from the removal arm 8, being moved forward and backward together with the removal arm 8 by means of being provided in the bracket 10. Incidentally, element T in FIG. 4 illustrates the vulcanized tire.

Figure 9:
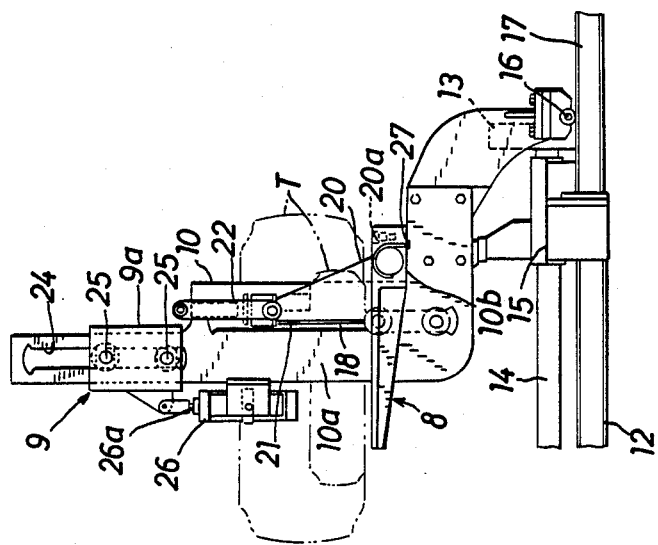
FIG. 9 is a front view of the bracket of the device of the present invention.

Referring then to FIGS. 7, 8, 9 and 10 which illustrate the detailed structure of the aforementioned centering arm 9 and the removal arm 8 in an auxiliary manner, as referred to previously in conjunction with FIGS. 1 to 3, it is apparent from FIG. 7 that since the embodiment adopts the twin type tire vulcanizing press 1, the holding shaft 23 is extruded from both sides of the sleeve 20a in the shaft support 23 which is provided on the bracket 10, the device itself, in a perpendicularly liftable manner, and correspondingly to two sets of vulcanizing metal molds, two groups of removal arms 8 and 8 are installed, but in the case of the single type vulcanizing press, the requirement is only to extrude the holding shaft 23 from one side of the sleeve 20a. In order to adjust a pair of arms 8a and 8b in the removal arm 8 in response to a change of the tire size, as shown in FIGS. 7 and 9, while a scale 27 wherein graduations 27a and 27b are separately provided on one side of the holding shaft 23, the arms 8a and 8b are removed in accordance with both the graduations 27a and 27b, thereby changing the distance between them to a flexible extent.

Figure 10:
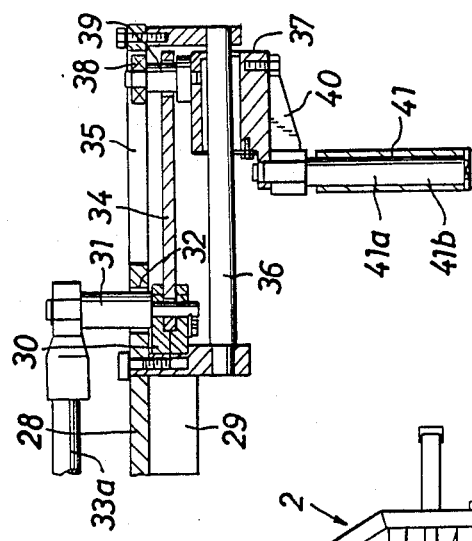
FIG. 10 is a detailed side sectional view of D part of FIG. 8.
Figure 8:
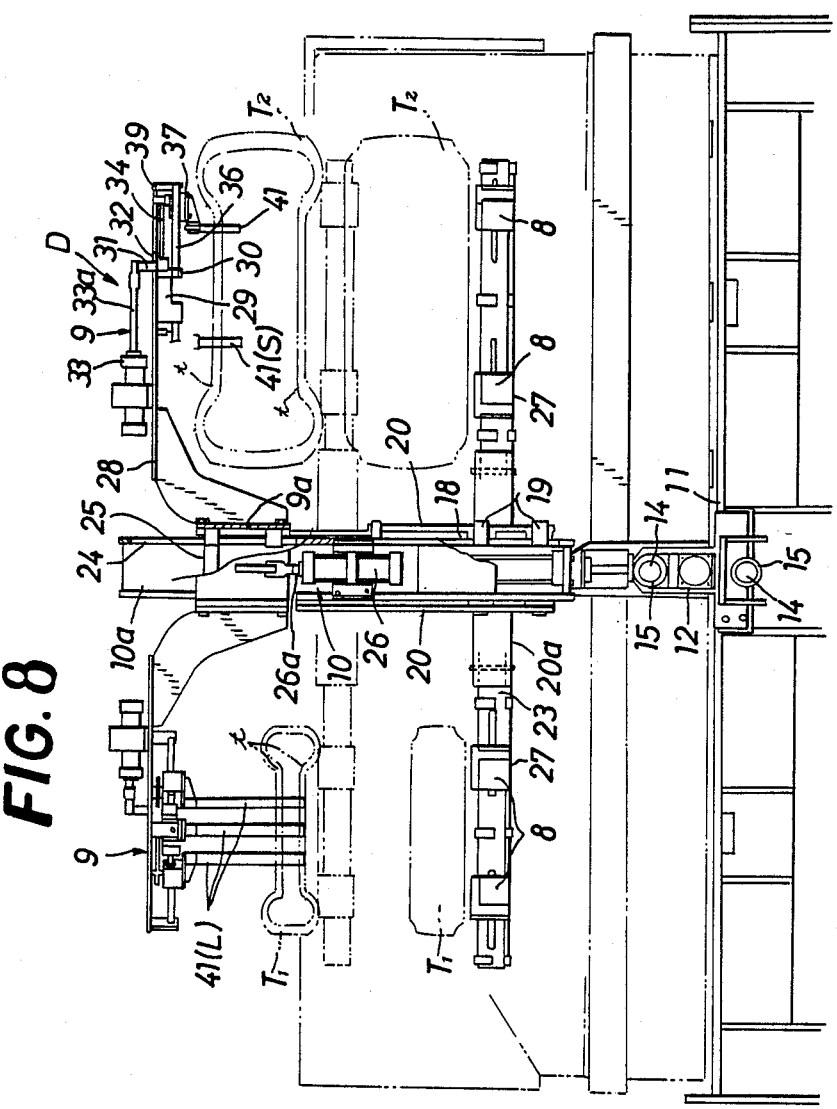
FIG. 8 is a front view of the same.
Figure 11A:
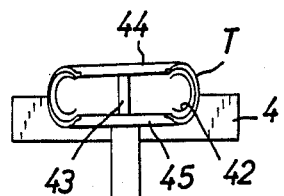
FIGS. 11-A to 11-F are explanatory views of the sequence of the state of actuating the device of the present invention.
Figure 11B:
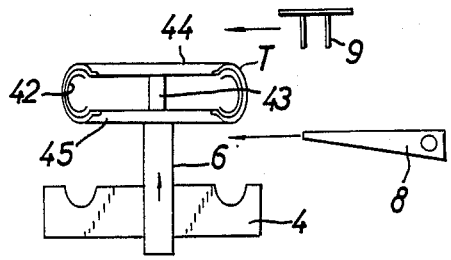
Figure 11C:
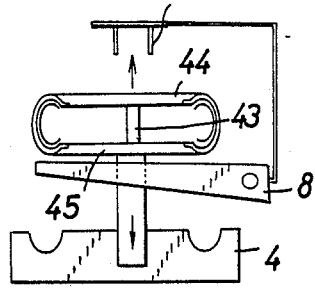
Figure 11D:
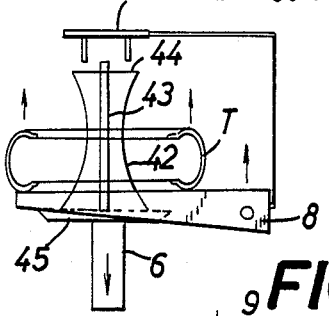
Figure 11E:
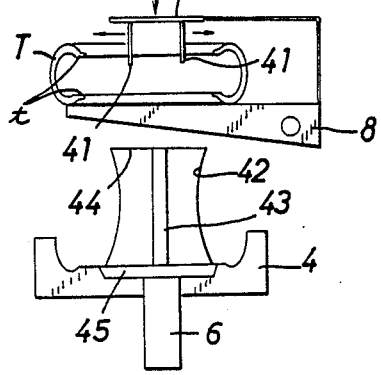
Figure 11F:
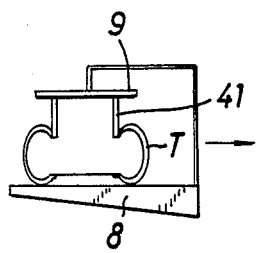

As is apparent from FIG. 7, the centering arm 9 also has two groups of arms 9 and 9 provided on both sides respectively of the main body 9a which is mounted on the upper side of the bracket 10 in a perpendicularly liftable manner, and in the case of the single type vulcanizing press, it is sufficiently satisfactory to provide one arm 9 only on one side of the main body 9a. Since both the centering arms 9 and 9, of course, employ the same structure, only one of them is explained below; as shown in FIGS. 7, 8 and 10, at the same time when a rotatable moving ring 30 is rotatably fitted around the external periphery of the support ring 29 which is integrally fixed to the lower face of an arm plate 28 being extruded from the main body 9a, a pin shaft 31 being provided on some part of the external periphery of the ring 30 in a standing manner is slidably held in arcuate guide hole 32 formed of the arm plate 28 to be removed insertionally from the upper surface of the arm plate 28, and is connected to the piston rod 33a of the drive cylinder 33 (operated by the fluid pressure such as the air pressure and others) being installed on the upper surface of the arm plate 28, whereby the rotatable moving ring 30 is adapted to be rotated in a forward and reverse direction. In FIG. 7, the centering arm 9 on the left side of the figure represents the upper surface of the arm plate 28, whereas the centering arm 9 on the right side thereof represents the lower surface of the arm plate 28.

Correspondingly, to actuating links 34, being illustrated to number three pieces, each of ends of which is pivotally mounted to the position located at the equally divided external periphery of the aforementioned rotatable moving ring 30, the same number of guide slots 35 are radially formed in the arm plate 28, the same number of guide bars 36 in parallel with the guide slots 35 are radially juxtaposed on the lower surface side of the arm plate 28 by means of fixing both the ends of the guide bars to the external peripheral of the arm plate 28 and the external peripheral end of the fixed support ring 29, and each of other ends of the aforementioned actuating links 34 is adapted to erect from a block 37 being slidably fitted on each of the foregoing guide bars 36, being pivotally mounted to each of pin shafts 39 which are slidably held by way of bearings 38 in the foregoing guide slots 35. At that time, each of other ends of the actuating links 34 is held down by way of a mounting bracket 40 to each of blocks 37, forming a right angle to the centering bars 41. Naturally, the number of the centering bars 41 is three pieces, but that is one example of the embodiment, and the number of the centering bars 41 which are arranged on the position being located at the equally divided periphery of the rotatable moving ring 30 as well as on the radial extended line thereof can be freely increased or decreased. In that case, the foregoing centering bar 41 and a round-rod-shaped article, as shown in FIG. 10, comprising a center shaft 41a and the sleeve 41b are used, and it is convenient, if the centering bar 41, being detachable and changeable, is able to be replaced depending upon the tire size, when being used. Namely, in FIG. 8, the centering arm 9, as shown in this left side of the figure, adopts the centering bar 41L the length of which is relatively longer so that it is illustrated to be in the state of centering the tire $T_1$ of smaller size, whereas the centering arm 9, as shown in this right side of the figure, adopts the centering bar 41S the length of which is relatively shorter so that it is illustrated to be in the state of centering the tire $T_2$ of larger size, whereby it enables the centering bar 41 to provide a general-purpose such that, if, while longer and shorter centering bars 41 are prepared in advance, only one of them is replaced depending upon the size of the tire T.

According to the centering bar 9 of the aforementioned embodiment, at the same time when the centering arm 9, as a whole, moves up and down perpendicularly by means of that main body 9a is adapted to move up and down by way of the actuation of the drive cylinder 26 along the perpendicular mounting part 10a of the bracket 10, the rotatable moving ring 30 is rotated counterclockwise along the support ring 29 by means of moving forward the piston rod 33a of the drive cylinder 33 in the centering arm 9, as shown in this right side of FIG. 7, in the arrowed direction, each of actuating links 34 attached to the rotatable moving ring 30 also accompanies correspondingly the same, the pin shaft 39 to which the front end of the actuating link 34 is connected moves straightforward along the guide slot 35 in the arm plate 28, and the block integral with the pin shaft 39 moves straightforward along the guide bar 36, accompanying the pin shaft 39, whereby each of the centering bars 41 advances synchronously toward the external side of a radial direction of the rotatively moving ring 30, while retracting the piston rod 33a automates the motion wherein each of the centering bars 41 moves back synchronously toward the internal side of a radial direction to be obtained by way of the clockwise rotational moving of the rotatable moving ring 30 so that, as shown in FIG. 8, moving back and forth of a plurality of centering bars 41 in a radial direction enables correction of the shift of the center of the tire T which is taken off from the vulcanizing press 1 by the removal arm 8 to be attained.

Figure 12:
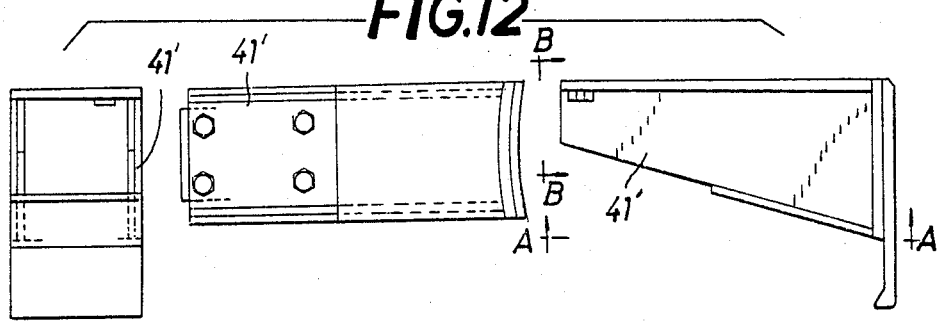
FIG. 12 is a front side view and a bottom view of another embodiment of the centering bar.

The mechanism of moving back and forth the removal arm 8 and the mechanism of moving up and down the same perpendicularly, the mechanism for moving up and down the centering arm 9 perpendicularly, and the mechanism for moving back and forth the centering bars 41 in a radial direction, all of which are explained as above, are not limited to the illustrated examples, and a change of their design is optional. The centering bar 41′, as shown in FIG. 12 as another embodiment, employs a facial contact with the tire in contrast with the point contact of the foregoing centering bar 41, so the former improves further its function.

According to the device of the present invention comprising the removal arm 8 and the centering arm 9, the removal of the vulcanized tire from the tire vulcanizing press 1 and the correction of the shift of its center are automated as follows. Namely, in FIGS. 11-A to 11-F which illustrate sequentially a serial moving process by the device of the present invention, FIG. 11-A illustrates the state wherein upon completion of vulcanizing and forming the tire T by the upper and lower metal molds 5 and 4 in the tire vulcanizing press 1, the upper metal mold 5 moves up. Reference number 42 in the drawing shows the bladder, extendable and contractible, the lower end of which is held by the lower clamp ring 45 arranged on the upper end of the central mechanism 6 and the upper end of which is held by the upper clamp ring 44 provided on the upper end of the liftable piston rod 43, the vulcanized tire T being in the state of remaining on the lower metal mold 4 with the internal sealing by bladder 42 being concurrently performed. In such a state, the removal arm 8 provided on the side of the bracket 10 stops at such a retracted, lower position as shown in FIGS. 1, 3, and 4 (in the right side of the figures).

Subsequently, as shown in FIG. 11-B, simultaneously with ascent of the central mechanism 6 by an elevating member such as the already known knock-out lever and other structures which permit the tire T to break away from the lower metal mold 4 and to move up, stopping at the takeoff position, in FIG. 4, retraction of the piston rod 12a of the drive cylinder 12 causes the bracket 10 to advance forward in left side of the figure and the removal arm 8 to be introduced under the lower surface of the tire T, which can be received by a pair of arms 8a and 8b. In that case, at the same time the bracket 10 horizontally advances with help of the guide shaft 14 and the guide sleeve 15, the removal arm 8 on the bracket 10 also assuredly safely supports the lower surface of the tire T, taking a horizontal attitude, with the help of the contacted support of the sleeve 20a in the shaft support 20 by the horizontal supporting part 10b. FIG. 11-C illustrates the state wherein the removal arm 8 supports the tire T, in the case wherein the centering arm 9 being similarly provided on the bracket 10 moves with the removal arm 8, reaching a position such as shown by FIG. 11-c. Furthermore, concurrent use of detecting means such as a limit switch of similar device which exactly restrict the rod stroke in the drive cylinder 12 and determine its longitudinal position enables the central position of both the arms 8 and 9 to easily be concentric to the central position of the lower metal mold 4 (the vulcanizing press center). A functional intention that the aforementioned centering arm 9 is maintained at such an ascendable position as shown in the this right side of FIG. 4 with the help of the actuation of the drive cylinder 26 is met by avoiding the centering arm 9 interfering with an expanding erection of the bladder 42, which is referred to shortly, when the tire T is released from the vulcanizing press 1. Subsequently, as shown in FIG. 11-D, the upper clamp ring 44 in the central mechanism 6 moves upward and the bladder 42 which linearly contacts with the internal tire is drawn out, breaking away from the tire T, whereby the bladder 42, being expanded in an erect cylindrical manner, becomes free from the tire T, under the state wherein the central mechanism 6, as a whole, moves down and actuation of the drive cylinder 21 permits the removal arm 8 which maintains a horizontal attitude to receive the tire T and to move up perpendicularly with a help of the ascent of the shaft support 20 being equipped with the guide slot 18 and the guide roller 19 which is removed, while being held in the guide slot 18, the removal arm 8 continues to move together with the tire T toward a predetermined ascendable position as shown in the left side of FIG. 4, stopping there. Subsequently, as shown in FIG. 11-E, to the tire T being horizontally supported on the removal arm 8 being located at such an ascendable position, the centering arm 9 which is similarly located at such an ascendable position as shown in this right side of FIG. 4, as shown in this left side of the figure, moves down perpendicularly along the guide slot 24 by way of the main body 9a of the drive cylinder 26, as shown in FIG. 8. Groups of centering bars 41 are introduced into a bead end in the vulcanized tire T being held by the removal arm 8, i.e., upper and lower opening edges t and t, at the time at which motion by the drive cylinder 33, the rotatively moving ring 30 and the block 37 helps the centering bars 41 move back and forth in a radial direction the center of which is identical to the center of the metal mold of the vulcanizing press, thereby performing correction of the shift of the center of the tire T. Thus, after centering the tire T, which is adapted to move upwardly by the removal arm 8, at its ascendable position, as shown in FIG. 11-F, while the tire T is vertically held by the removal arm 8 and the centering arm 9, actuation of the drive cylinder 12 helps the bracket 10 move back, thereby enabling the tire T to move to the side of the inflator 2.

The present embodiment, as shown in this right side of FIG. 4, presents an illustrated example of the arrangement in which after centering the tire T which moves up and down by means of the removal arm 8, with the centering arm 9, the removal arm 8 is adapted to move back under the state of moving down the centering arm 9, which is then adapted to move up reversely at the retracted position of the removal arm 8 so that the centering arm 9 may break away from the tire T, and the removal arm 8 and the tire T are adapted to move down at the retreating position, resulting in a return to their primary position.

Obviously, numerous modifications and variations of the present invention are possible in light of the above teachings. It is therefore to be understood that within the scope of the appended claims, the invention may be practiced otherwise than as specifically described herein.

What is claimed is:

1. A tire vulcanizing press, comprising:
   a mold for being opened and closed;
   a central mechanism arranged on a center portion of a lower portion of said mold;
   a bladder held in said central mechanism in a liftable, extendable, and contractible manner;
   an unloading device provided on a side of said mold for a tire to be removed from said mold; said unloading device including a tire removal arm which is horizontally linearly movable back and forward with respect to said and movable perpendicularly up and down at a center portion of the mold said unloading device further including a centering arm which includes a plurality of centering bars movably radially of said tire, wherein said centering arm is movable back and forward with said removal arm, and also independently movable up and down perpendicularly at the center of said mold.

2. The press as defined in claim 1, wherein said unloading device further comprises a drive cylinder and a bracket for supporting commonly said tire removal arm and the said centering arm, wherein said bracket is movable linearly back and forward by said drive cylinder with respect to said mold.

3. The press as defined in claim 1, wherein said unloading device further comprises a holding shaft and a shaft support having a guide roller slidably held in a guide slot formed in said bracket and wherein said removal arm further comprises a pair of arms which are adjustable as to the distance between said pair of arms depending upon the tire size, which are movably mounted to said holding shaft.

4. The press as defined in claim 1, wherein said centering arm further comprises a rotatable moving ring and wherein said centering bars are arranged on an extended radial line at the position located on an equally divided periphery of said rotatable moving ring of said centering arm.

5. The press as defined in claim 4, wherein said centering bars are detachable.

* * * * *